US010186273B2

(12) United States Patent
Lee et al.

(10) Patent No.: US 10,186,273 B2
(45) Date of Patent: Jan. 22, 2019

(54) METHOD AND APPARATUS FOR ENCODING/DECODING AN AUDIO SIGNAL

(71) Applicant: SAMSUNG ELECTRONICS CO., LTD., Suwon-si (KR)

(72) Inventors: Nam-suk Lee, Suwon-si (KR); Hyun-wook Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 63 days.

(21) Appl. No.: 15/105,363

(22) PCT Filed: Nov. 25, 2014

(86) PCT No.: PCT/KR2014/011365
§ 371 (c)(1),
(2) Date: Jun. 16, 2016

(87) PCT Pub. No.: WO2015/093742
PCT Pub. Date: Jun. 25, 2015

(65) Prior Publication Data

US 2017/0018280 A1 Jan. 19, 2017

(30) Foreign Application Priority Data

Dec. 16, 2013 (KR) ........................ 10-2013-0156643

(51) Int. Cl.
*G10L 19/00* (2013.01)
*G10L 21/00* (2013.01)
(Continued)

(52) U.S. Cl.
CPC ............ *G10L 19/265* (2013.01); *G10L 19/02* (2013.01); *G10L 19/167* (2013.01)

(58) Field of Classification Search
None
See application file for complete search history.

(56) References Cited

U.S. PATENT DOCUMENTS 5,848,391 A 12/1998 Bosi et al.
6,064,954 A * 5/2000 Cohen ................. G10L 19/0212 704/206

(Continued)

FOREIGN PATENT DOCUMENTS

EP 0 788 091 A2 8/1997
EP 2 099 026 A1 9/2009

(Continued)

OTHER PUBLICATIONS

International Search Report dated Feb. 16, 2015 issued by the International Searching Authority in counterpart International Application No. PCT/KR2014/011365 (PCT/ISA/210).

(Continued)

*Primary Examiner* — Kevin Ky
(74) *Attorney, Agent, or Firm* — Sughrue Mion, PLLC

(57) ABSTRACT

Provided are a method and apparatus for encoding an audio signal and a method and apparatus for decoding an audio signal, in which errors generated during encoding and decoding of the audio signal are reduced to enhance the audio quality of a reconstructed audio signal. The method of encoding the audio signal includes detecting a pitch of the audio signal, determining a filter coefficient based on the detected pitch, performing second filtering on the audio signal, based on the determined filter coefficient; and encoding an audio signal resulting from the second filtering.

8 Claims, 13 Drawing Sheets

(51) Int. Cl.

| | |
|---|---|
| ***G10L 19/26*** | (2013.01) |
| ***G10L 19/02*** | (2013.01) |
| ***G10L 19/16*** | (2013.01) |

(56) References Cited

U.S. PATENT DOCUMENTS

| | | | | |
|---|---|---|---|---|
| 7,672,837 | B2 | 3/2010 | Bessette et al. | |
| 2003/0088402 | A1* | 5/2003 | Hoory | G10L 15/02 704/207 |
| 2005/0108007 | A1 | 5/2005 | Bessette et al. | |
| 2006/0062215 | A1 | 3/2006 | Lam | |
| 2006/0089832 | A1 | 4/2006 | Ojanpera | |
| 2007/0088546 | A1 | 4/2007 | Song et al. | |
| 2008/0052066 | A1 | 2/2008 | Oshikiri et al. | |
| 2009/0299736 | A1 | 12/2009 | Sato | |
| 2009/0326930 | A1 | 12/2009 | Kawashima et al. | |
| 2010/0138219 | A1 | 6/2010 | Oshikiri | |
| 2010/0161323 | A1 | 6/2010 | Oshikiri | |
| 2010/0286990 | A1 | 11/2010 | Biswas et al. | |
| 2012/0101824 | A1 | 4/2012 | Chen | |
| 2013/0185066 | A1* | 7/2013 | Tzirkel-Hancock | G10L 15/20 704/233 |
| 2014/0046670 | A1 | 2/2014 | Moon et al. | |
| 2014/0200890 | A1* | 7/2014 | Kurniawati | G10L 15/144 704/236 |
| 2014/0236588 | A1* | 8/2014 | Subasingha | G10L 19/07 704/219 |

FOREIGN PATENT DOCUMENTS

| | | | |
|---|---|---|---|
| KR | 10-2008-0034819 | A | 4/2008 |
| WO | 2013/183928 | A1 | 12/2013 |

OTHER PUBLICATIONS

Written Opinion dated Feb. 16, 2015 issued by the International Searching Authority in counterpart International Application No. PCT/KR2014/011365 (PCT/ISA/237).

Communication dated Apr. 11, 2017, from the European Patent Office in counterpart European Application No. 14872819.9.

* cited by examiner

[Fig. 1]
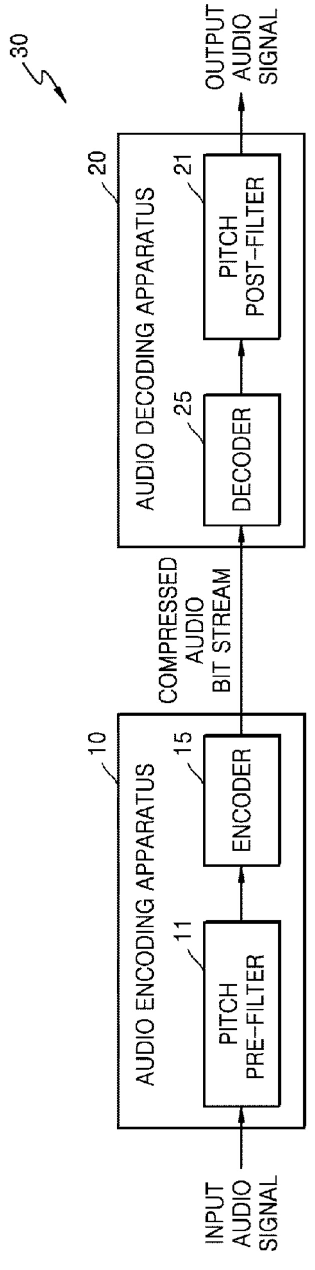

[Fig. 2]
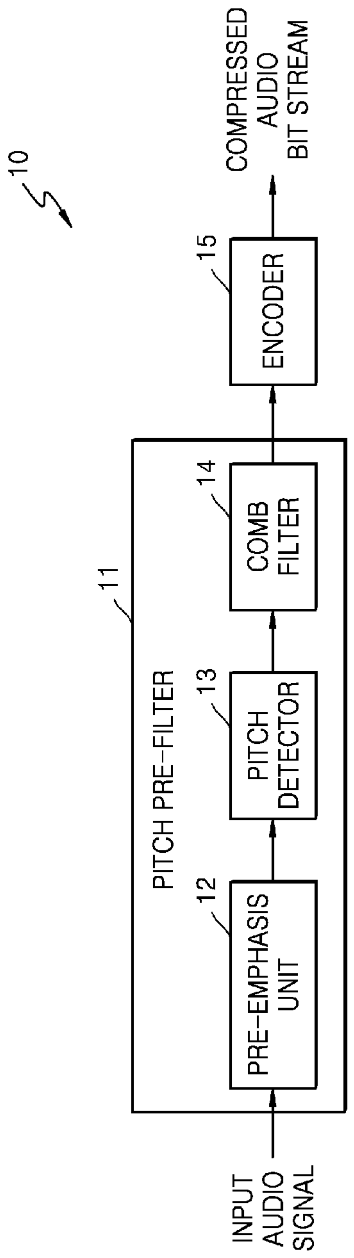
[Fig. 3]
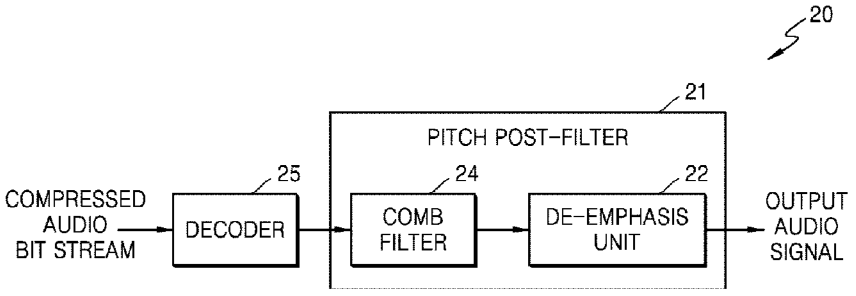

[Fig. 4a]
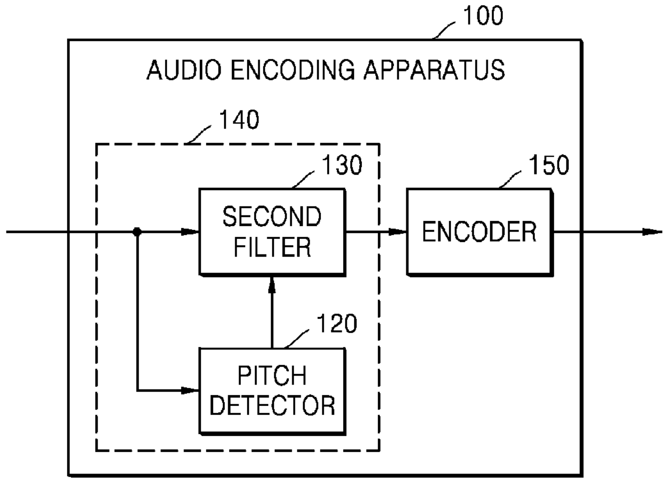
[Fig. 4b]
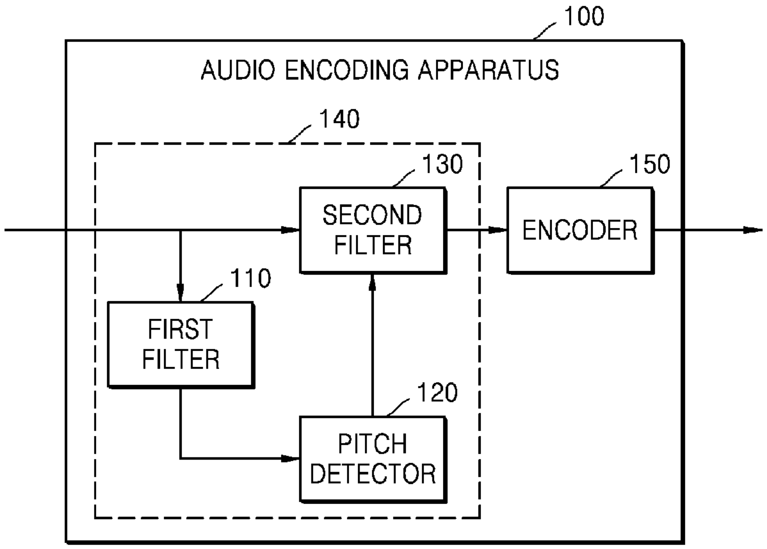
[Fig. 5]
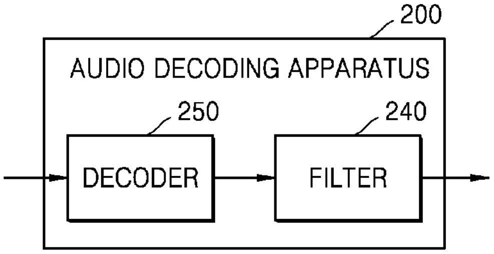

[Fig. 6]
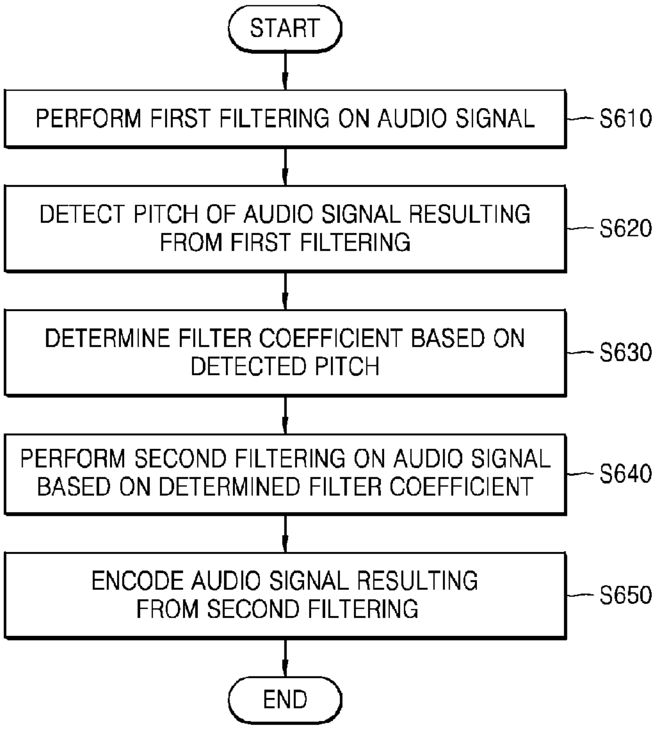
[Fig. 7]
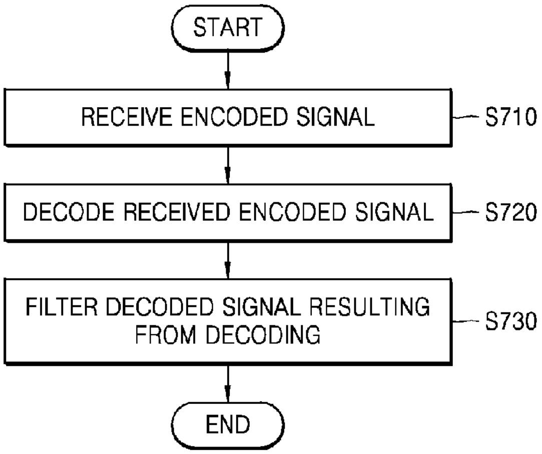
[Fig. 8a]
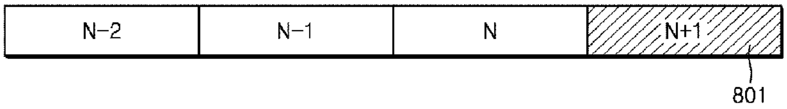
[Fig. 8b]
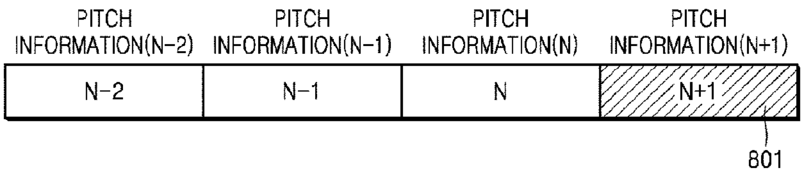

[Fig. 8c]
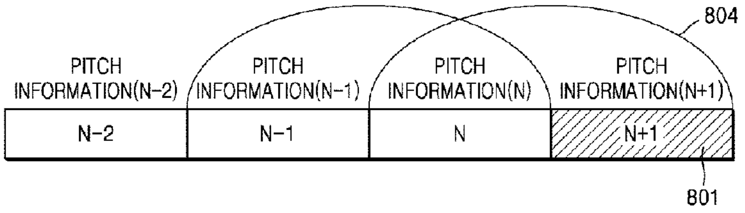
[Fig. 8d]
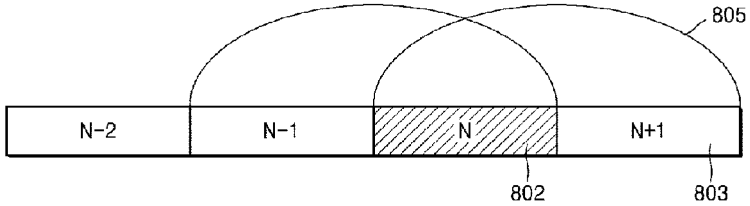
[Fig. 8e]
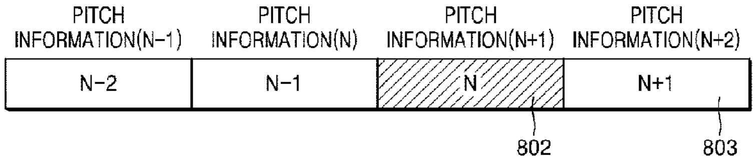
[Fig. 9]
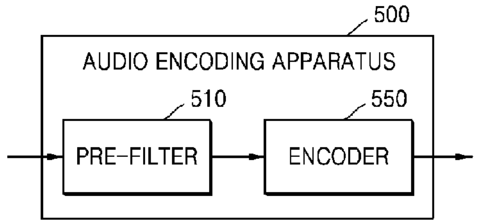
[Fig. 10]
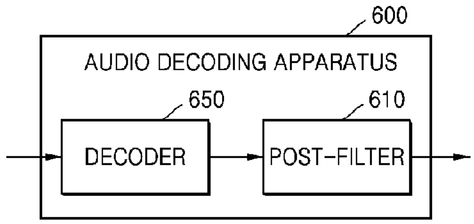
[Fig. 11a]
[Fig. 11b]
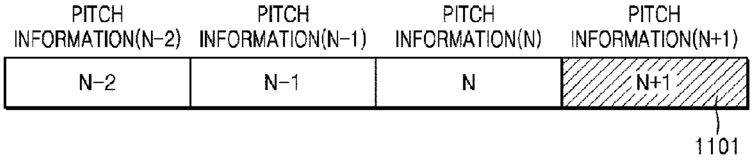

[Fig. 11c]
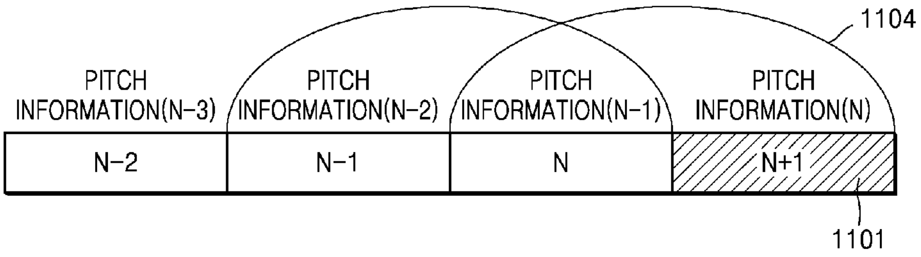
[Fig. 11d]
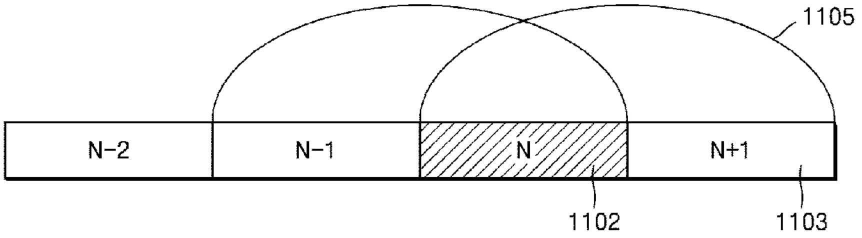
[Fig. 11e]
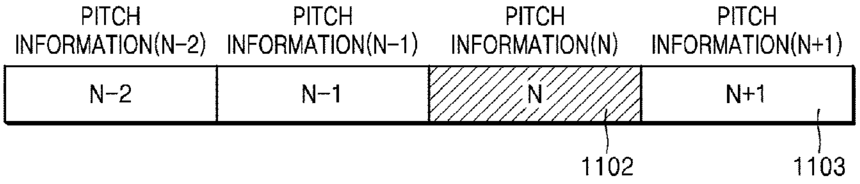
[Fig. 12]
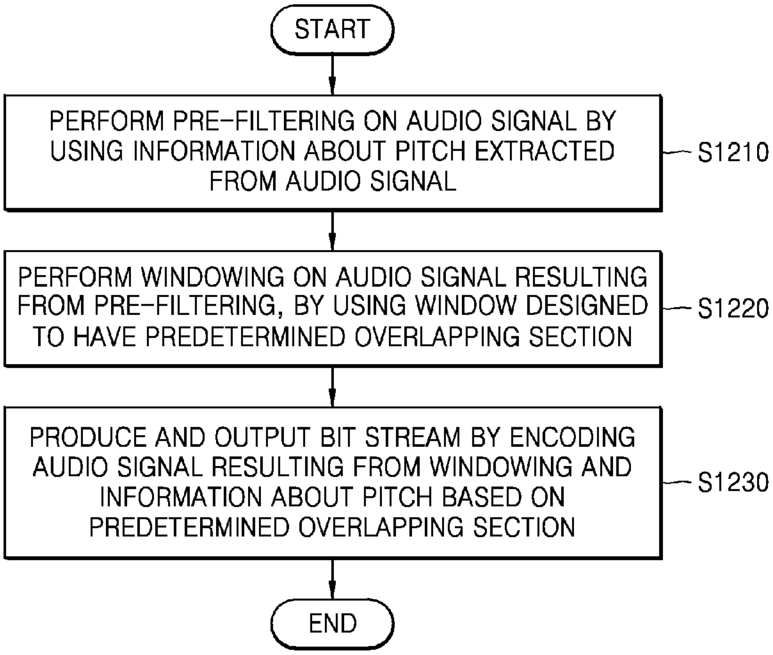

[Fig. 13]
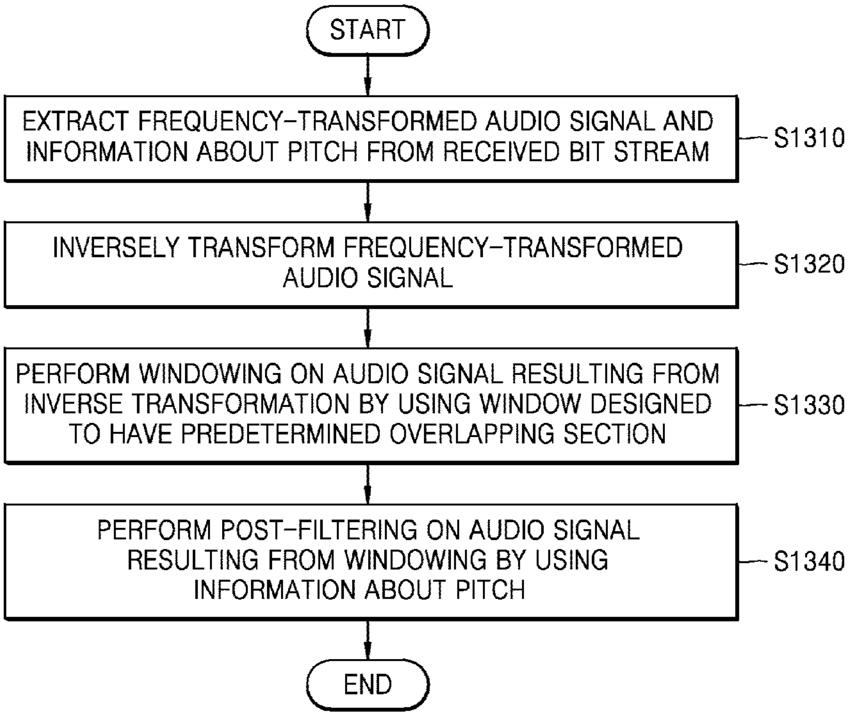

[Fig. 14a]
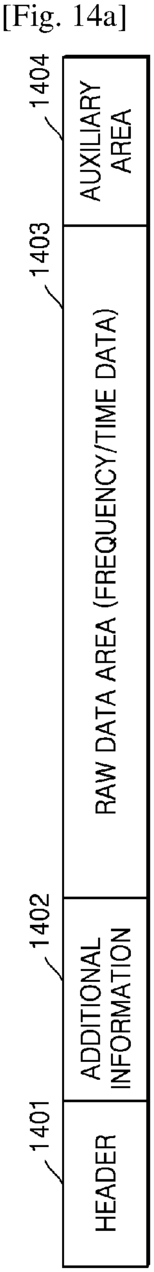

[Fig. 14b]
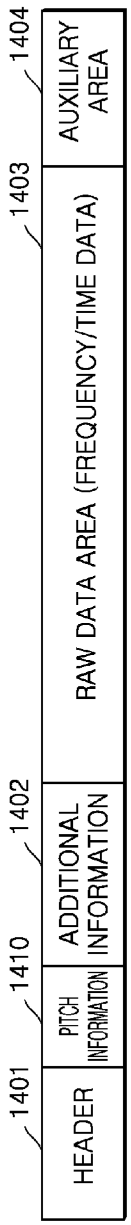

[Fig. 14c]

1401
HEADER
1402
ADDITIONAL INFORMATION
1410
PITCH INFORMATION
1403
RAW DATA AREA (FREQUENCY/TIME DATA)
1404
AUXILIARY AREA

[Fig. 14d]
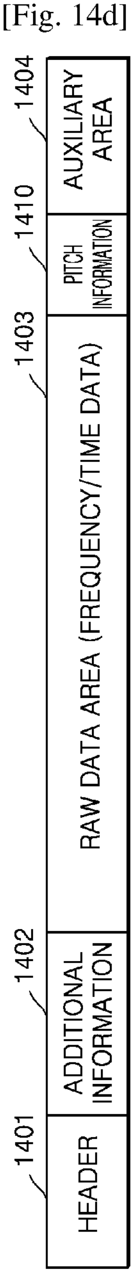

[Fig. 14e]
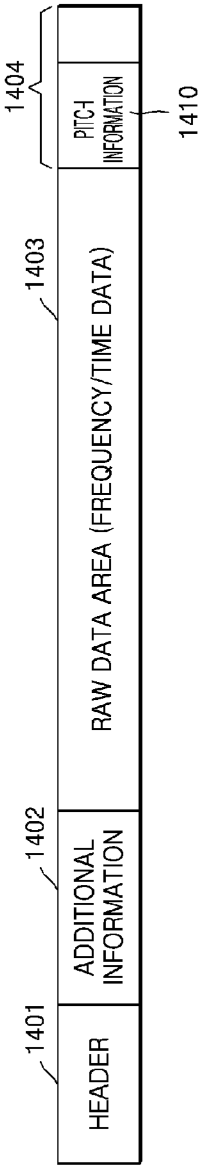
[Fig. 15a]
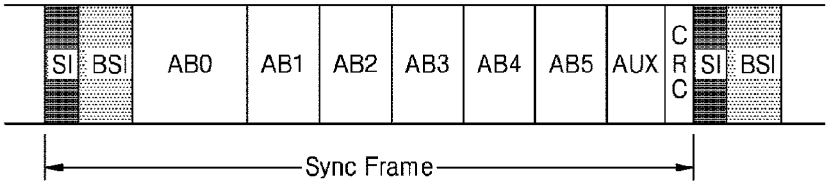
[Fig. 15b]
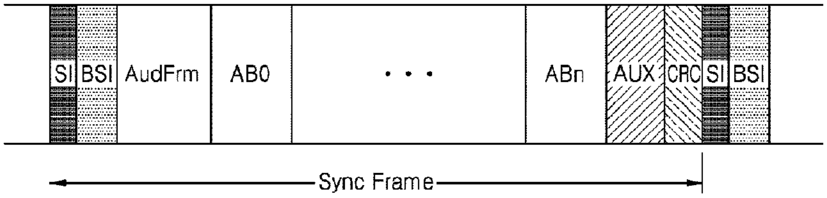

[Fig. 16]
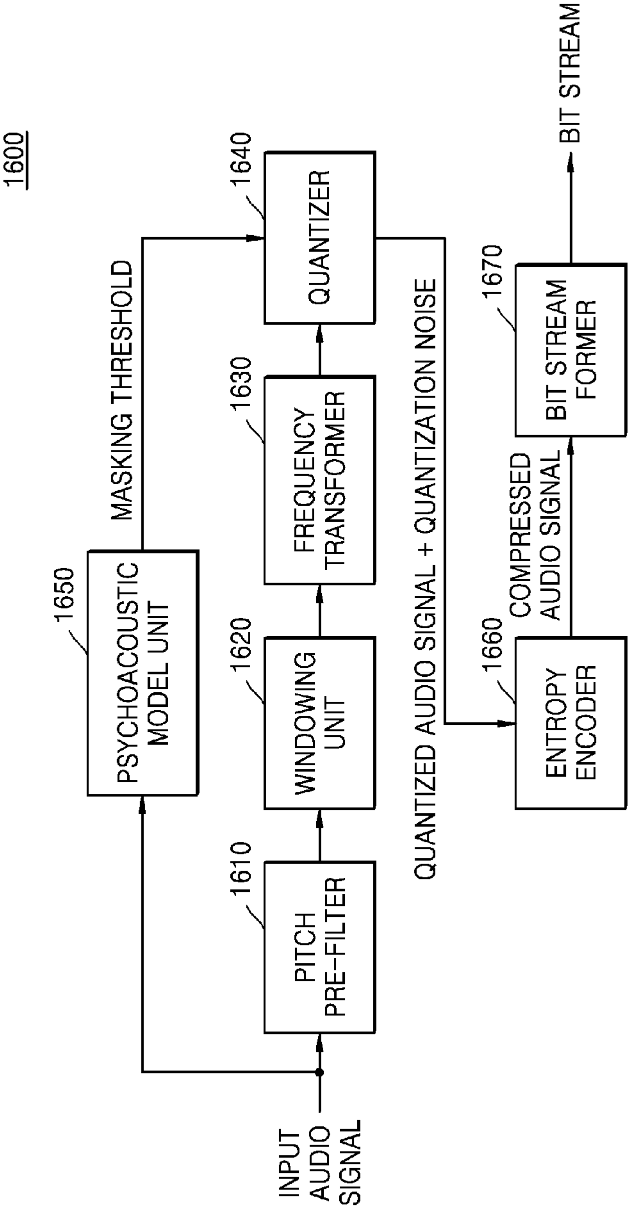

METHOD AND APPARATUS FOR ENCODING/DECODING AN AUDIO SIGNAL

TECHNICAL FIELD

One or more embodiments of the present invention relate to a method and apparatus for encoding or decoding an audio signal, and more particularly, to a method and apparatus for encoding or decoding an audio signal by using a pitch filter.

BACKGROUND ART

When encoding an audio signal, to secure a short latency time, the length of a frame, which is a basic unit of encoding, should be small. Alternatively, to secure high sound quality, the length of a frame should be enough long to achieve a sufficient frequency resolution. Thus, it is difficult to simultaneously obtain a short latency time and high sound quality.

General audio encoding systems may degrade quality of sound by reducing the length of a frame according to an application to be used in order to shorten a latency time. Alternatively, in order to shorten a latency time, general audio encoding systems may use a certain type of window function which precludes perfect reconstruction of sound. Particularly in applications that require a short latency time, a short frame causes a reduction in frequency resolution and sound quality.

In audio encoding systems which use a short window for a short latency time, a pitch filter may be used to reduce coding distortion that noticeably occurs on music and speech which have periodic waveforms.

DISCLOSURE OF INVENTION

Technical Problem

One or more embodiments of the present invention include a method and apparatus for encoding an audio signal and a method and apparatus for decoding an audio signal, in which errors generated during encoding and decoding of the audio signal are reduced to enhance the audio quality of a reconstructed audio signal.

Solution to Problem

One or more embodiments of the present invention include a method and apparatus for encoding an audio signal and a method and apparatus for decoding an audio signal, in which errors generated during encoding and decoding of the audio signal are reduced to enhance the audio quality of a reconstructed audio signal.

Additional aspects will be set forth in part in the description which follows and, in part, will be apparent from the description, or may be learned by practice of the presented embodiments.

According to one or more embodiments of the present invention, an audio encoding method includes detecting a pitch of an audio signal; determining a filter coefficient based on the detected pitch; performing second filtering on the audio signal, based on the determined filter coefficient; and encoding an audio signal resulting from the second filtering.

The audio encoding method may further include performing first filtering on the audio signal, wherein the detecting of the pitch comprises detecting a pitch of the audio signal which results from the first filtering.

The performing of the first filtering may include performing pre-emphasis of increasing magnitudes of frequency components belonging to a certain band included in the audio signal so that the magnitudes are greater than magnitudes of other frequency components which do not belong to the certain band.

The detecting of the pitch may include acquiring, from the audio signal, information about the pitch which comprises at least one of a pitch period, a pitch gain, a pitch tap, and a flag indicating whether the second filtering has been performed.

The performing of the second filtering may include performing comb filtering on the audio signal.

The detecting of the pitch may include acquiring information about the pitch from the audio signal. The encoding of the audio signal resulting from the second filtering may include producing and outputting a bit stream, the bit stream including the audio signal resulting from the second filtering and the information about the pitch. The information about the pitch may include at least one of a pitch period, a pitch gain, a pitch tap, and a flag indicating whether the second filtering has been performed.

The producing and outputting of the bit stream may include producing and outputting the bit stream such that the information about the pitch is located in an auxiliary area of the bit stream.

The detecting of the pitch may include acquiring information about the pitch from each of a plurality of frames into which the audio signal has been split, the information about the pitch including a pitch period, a pitch gain, a pitch tap, and a flag indicating whether the second filtering has been performed. The encoding of the audio signal resulting from the second filtering may include delaying the information about the pitch by one frame; and producing and outputting a bit stream, the bit stream including the audio signal resulting from the second filtering and the delayed information about the pitch.

According to one or more embodiments of the present invention, an audio decoding method including receiving an encoded signal; decoding the received encoded signal; and filtering a decoded signal resulting from the decoding. The encoded signal is produced by detecting a pitch of an audio signal, performing second filtering on the audio signal based on the detected pitch, and encoding an audio signal resulting from the second filtering. The filtering of the decoded signal includes performing inverse filtering of the second filtering.

In the audio decoding method, the encoded signal may be produced by performing first filtering on the audio signal and detecting a pitch of an audio signal resulting from the first filtering.

In the audio decoding method, the receiving of the encoded signal may include receiving the encoded signal, the encoded signal including information about the pitch acquired from the audio signal resulting from the first filtering. The filtering of the decoded signal may include extracting the information about the pitch from the received encoded signal; and determining a filter coefficient for filtering the decoded signal, based on the information about the pitch.

According to one or more embodiments of the present invention, an audio encoding apparatus includes a pitch detector which detects a pitch of an audio signal; a second filter which determines a filter coefficient based on the detected pitch and performs second filtering on the audio signal based on the determined filter coefficient; and an encoder which encodes an audio signal resulting from the second filtering.

The audio encoding apparatus may further include a first filter which performs first filtering on the audio signal, and the pitch detector may detect a pitch of the audio signal which results from the first filtering.

In the audio encoding apparatus, the first filter may perform pre-emphasis of increasing magnitudes of frequency components belonging to a certain band included in the audio signal so that the magnitudes are greater than magnitudes of other frequency components which do not belong to the certain band.

In the audio encoding apparatus, the pitch detector may acquire, from the audio signal, information about the pitch which includes a pitch period, a pitch gain, a pitch tap, and a flag indicating whether the second filter has been applied.

In the audio encoding apparatus, the second filter may perform comb filtering on the audio signal.

In the audio encoding apparatus, the pitch detector may acquire information about the pitch from the audio signal, the encoder may produce and output a bit stream, the bit stream including the audio signal resulting from the second filtering and the information about the pitch, and the information about the pitch may include at least one of a pitch period, a pitch gain, a pitch tap, and a flag indicating whether the second filter has been applied.

In the audio encoding apparatus, the encoder may produce and output the bit stream such that the information about the pitch is located in an auxiliary area of the bit stream.

In the audio encoding apparatus, the pitch detector may acquire information about the pitch from each of a plurality of frames into which the audio signal has been split, the information about the pitch comprising at least one of a pitch period, a pitch gain, a pitch tap, and a flag indicating whether the second filter has been applied. The encoder may delay the information about the pitch by one frame and produce and output a bit stream, the bit stream including the audio signal resulting from the second filtering and the delayed information about the pitch.

According to one or more embodiments of the present invention, an audio decoding apparatus includes a decoder which receives and decodes an encoded signal; and a filter which filters a decoded signal resulting from the decoding. The encoded signal is produced by detecting a pitch of an audio signal, performing second filtering on the audio signal based on the detected pitch, and encoding an audio signal resulting from the second filtering, and the filter performs inverse filtering of the second filtering.

In the audio decoding apparatus, the encoded signal may be produced by performing first filtering on the audio signal and detecting a pitch of an audio signal resulting from the first filtering.

In the audio decoding apparatus, the decoder receives the encoded signal, the encoded signal including information about the pitch acquired from the audio signal resulting from the first filtering. The filter may extract the information about the pitch from the received encoded signal and determine a filter coefficient for filtering the decoded signal, based on the information about the pitch.

According to one or more embodiments of the present invention, an audio encoding method includes pre-filtering an audio signal by using information about a pitch acquired from the audio signal; performing windowing on an audio signal resulting from the pre-filtering by using a window having a predetermined overlapping section; and producing and outputting a bit stream by encoding an audio signal resulting from the windowing and by encoding the information about the pitch, based on the predetermined overlapping section.

In the audio encoding method, the producing and outputting of the bit stream may include determining encoding delay based on the predetermined overlapping section; and delaying the information about the pitch according to the determined encoding delay and outputting delayed information about the pitch.

In the audio encoding method, the pre-filtering of the audio signal may include acquiring the information about the pitch from each of a plurality of frames into which the audio signal has been split. A length of the overlapping section may be 50% or more of the window, and the producing and outputting of the bit stream may include delaying the information about the pitch by one frame based on the overlapping section and outputting delayed information about the pitch.

In the audio encoding method, the producing and outputting of the bit stream may include producing and outputting the bit stream such that the information about the pitch is located in an auxiliary area of the bit stream. The information about the pitch may include at least one of a pitch period, a pitch gain, a pitch tap, and a flag indicating whether the pre-filtering has been performed.

In the audio encoding method, the information about the pitch may include a flag indicating whether the pre-filtering has been performed, and may further include at least one of a pitch period, a pitch gain, and a pitch tap. The producing and outputting of the bit stream may include producing and outputting the bit stream such that the flag is located in a header of the bit stream and at least one of the pitch period, the pitch gain, and the pitch tap is located in an auxiliary area of the bit stream.

In the audio encoding method, the pre-filtering of the audio signal may include performing first filtering on the audio signal; acquiring the information about the pitch from an audio signal resulting from the first filtering; determining a filter coefficient based on the information about the pitch; and performing second filtering on the audio signal, based on the determined filter coefficient.

According to one or more embodiments of the present invention, an audio decoding method includes acquiring a frequency-transformed audio signal and information about a pitch from a received bit stream; inversely transforming the frequency-transformed audio signal; performing windowing on an audio signal resulting from the inverse transformation by using a window having an overlapping section; post-filtering an audio signal resulting from the windowing by using the information about the pitch, wherein the post-filtering corresponds to pre-filtering performed during encoding, and the information about the pitch is encoded in the received bit stream based on the overlapping section.

In the audio decoding method, the information about the pitch may be delayed according to an encoding delay determined based on the overlapping section.

In the audio decoding method, the post-filtering of the audio signal may include acquiring the information about the pitch from an auxiliary area of the received bit stream, and the information about the pitch may include at least one of a pitch period, a pitch gain, a pitch tap, and a flag indicating whether the pre-filtering has been performed.

According to one or more embodiments of the present invention, an audio encoding apparatus includes a pre-filter which pre-filters an audio signal by using information about a pitch acquired from the audio signal; and an encoder which produces and outputs a bit stream by performing windowing on an audio signal resulting from the pre-filtering by using a window having a predetermined overlapping section and by encoding an audio signal resulting from the windowing and encoding the information about the pitch, based on the predetermined overlapping section.

In the audio encoding apparatus, the encoder may determine encoding delay based on the predetermined overlapping section, delay the information about the pitch according to the determined encoding delay, and output delayed information about the pitch.

In the audio encoding apparatus, the pre-filter may acquire the information about the pitch from each of a plurality of frames into which the audio signal has been split, a length of the overlapping section may be 50% or more of the window, and the encoder may delay the information about the pitch by one frame based on the overlapping section and output delayed information about the pitch.

In the audio encoding apparatus, the encoder may produce and output the bit stream such that the information about the pitch is located in an auxiliary area of the bit stream, and the information about the pitch may include at least one of a pitch period, a pitch gain, a pitch tap, and a flag indicating whether the pre-filter has been applied.

In the audio encoding apparatus, the information about the pitch may include a flag indicating whether the pre-filter has been applied and may further include at least one of a pitch period, a pitch gain, and a pitch tap. The encoder may produce and output the bit stream such that the flag is located in a header of the bit stream and at least one of the pitch period, the pitch gain, and the pitch tap is located in an auxiliary area of the bit stream.

In the audio encoding apparatus, the pre-filter may perform first filtering on the audio signal, acquire the information about the pitch from an audio signal resulting from the first filtering, determine a filter coefficient based on the information about the pitch, and perform second filtering on the audio signal by using the determined filter coefficient.

According to one or more embodiments of the present invention, an audio decoding apparatus includes a decoder that acquires a frequency-transformed audio signal and information about a pitch from a received bit stream, inversely transforms the frequency-transformed audio signal, and performs windowing on an audio signal resulting from the inverse transformation by using a window having a predetermined overlapping section; and a post-filter which post-filters an audio signal resulting from the windowing by using the information about the pitch. The post-filter performs post-filtering corresponding to pre-filtering performed during encoding, and the information about the pitch is encoded in the received bit stream based on the overlapping section.

In the audio decoding apparatus, the information about the pitch may be delayed according to an encoding delay determined based on the overlapping section.

In the audio decoding apparatus, the post-filter may acquire the information about the pitch from an auxiliary area of the received bit stream, and the information about the pitch may include at least one of a pitch period, a pitch gain, a pitch tap, and a flag indicating whether the pre-filtering has been performed.

According to one or more embodiments of the present invention, a non-transitory computer-readable recording medium has recorded thereon a program, which, when executed by a computer, performs the above-described methods.

BRIEF DESCRIPTION OF DRAWINGS

These and/or other aspects will become apparent and more readily appreciated from the following description of the embodiments, taken in conjunction with the accompanying drawings in which:

FIG. 1 is a block diagram of a general audio codec system;

FIG. 2 is a block diagram of a general audio encoding apparatus that performs pitch pre-filtering;

FIG. 3 is a block diagram of a general audio decoding apparatus that performs pitch post-filtering;

FIGS. 4A and 4B are block diagrams of audio encoding apparatuses according to embodiments of the present invention;

FIG. 5 is a block diagram of an audio decoding apparatus according to an embodiment of the present invention;

FIG. 6 is a flowchart of an audio encoding method according to an embodiment of the present invention;

FIG. 7 is a flowchart of an audio decoding method according to an embodiment of the present invention;

FIGS. 8A-8E are diagrams for explaining delay that occurs in a general audio codec system;

FIG. 9 is a block diagram of an audio encoding apparatus according to another embodiment of the present invention;

FIG. 10 is a block diagram of an audio decoding apparatus according to another embodiment of the present invention;

FIGS. 11A-11E are diagrams for explaining a method in which an audio codec system according to an embodiment of the present invention transmits information about a pitch based on a point in time when a frame is decoded;

FIG. 12 is a flowchart of an audio encoding method according to another embodiment of the present invention;

FIG. 13 is a flowchart of an audio decoding method according to another embodiment of the present invention;

FIGS. 14A-14E are diagrams for explaining a structure of a bit stream including information about a pitch, according to an embodiment of the present invention;

FIGS. 15A and 15B illustrate a structure of a bit stream for use in an AC-3 codec and a structure of a bit stream for use in an E-AC3 codec; and FIG. 16 is a block diagram of an audio encoding apparatus using a psychoacoustic model, according to an embodiment of the present invention.

MODE FOR THE INVENTION

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of", when preceding a list of elements, modify the entire list of elements and do not modify the individual elements of the list.

In the specification, the terminology below may be interpreted according to the following criteria, and even terms not used herein may be interpreted according to the point below.

The term "~unit" or "~er" used in the embodiments indicates a component including software or hardware, such as a Field Programmable Gate Array (FPGA) or an Application-Specific Integrated Circuit (ASIC), and the term "~unit" or "~er" performs certain roles. However, the "~ unit" or "~er" is not limited to software or hardware. The term "~unit" or "~er" may be configured to be included in an addressable storage medium or to reproduce one or more processors. Thus, the term "~ unit" or "~er" may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and units may be combined into a smaller number of components and units or may be further separated into additional components and units.

The term "size of a window" indicates the number of coefficients in a frequency domain which are generated by applying time-frequency transformation to a group of frames in a time domain, when windowing is performed on an audio signal by using the window such that the audio signal is split into the plurality of groups of frames in a time domain.

The term "Information" used herein includes all of values, parameters, coefficients, components, and the like and may be differently interpreted according to circumstances, and one or more embodiments of the present invention are not limited thereto.

An audio signal is distinguished from a video signal in a broad sense and may be a signal that is audible in reproduction. The audio signal is distinguished from a speech signal in a narrow sense and has no speech characteristics or some speech characteristics. In the specification, the audio signal may be interpreted in a broad sense, and may be interpreted in a narrow sense when being distinguished from a speech signal.

A frame is a data unit for encoding or decoding an audio signal and is not limited to a certain number of samples or a certain amount of time.

Pitch filtering denotes a method of filtering out a time period, namely, a pitch, from an audio signal to increase encoding efficiency.

A method and apparatus for encoding/decoding an audio signal, according to an embodiment of the present invention, may be a method and apparatus for encoding/decoding frequency transformation coefficients of an audio signal, and may also be an audio signal processing method and apparatus to which the method and apparatus for encoding/decoding frequency transformation coefficients of an audio signal are applied.

For convenience of explanation, operations of an audio encoding/decoding method and apparatus for a single window may be described herein. However, in an audio encoding/decoding method and apparatus according to an embodiment of the present invention, the described operations may be repeated for each of a plurality of windows into which an audio signal is split.

The present invention will now be described more fully with reference to the accompanying drawings, in which exemplary embodiments of the invention are shown.

FIG. 1 is a block diagram of a general audio codec system 30.

Referring to FIG. 1, the general audio codec system 30 includes an audio encoding apparatus 10 and an audio decoding apparatus 20.

The audio encoding apparatus 10 receives an input audio signal and encodes the input audio signal. The audio encoding apparatus 10 produces a compressed audio bit stream by encoding the input audio signal. The audio decoding apparatus 20 receives and decodes the compressed audio bit stream. The audio decoding apparatus 20 produces an output audio signal by decoding the compressed audio bit stream.

The audio encoding apparatus 10 may process the input audio signal on a frame-by-frame basis. For example, each frame may have a frame size between 2.5 millisecond (ms) and 40 ms and include audio samples corresponding to the frame size.

An encoder 15 of the audio encoding apparatus 10 may transform time-domain audio signal samples to frequency-domain transform coefficients. The encoder 15 may quantize, encode, or compress the frequency-domain transform coefficients. The encoder 15 may transmit a bit stream corresponding to the compressed frequency-domain transform coefficients to the audio decoding apparatus 20 directly, or may store the bit stream in a storage medium and later transmit the stored bit stream to the audio decoding apparatus 20.

A decoder 25 of the audio decoding apparatus 20 decodes the compressed audio bit stream to recover quantized transform coefficients. The audio decoding apparatus 20 may apply an inverse transform to change the quantized transform coefficients back into the time-domain audio signal samples. The audio decoding apparatus 20 may perform an overlap-adding operation to smoothen out time-domain waveform discontinuities at frame boundaries.

When the waveform of an audio signal is periodic, the human auditory system tends to be more sensitive to very small coding distortions in the audio signal. Thus, a pitch pre-filter 11 and a pitch post-filter 21 may be used to reduce coding distortion that noticeably occurs in music and audio signals which have periodic waveforms.

The pitch pre-filter 11 and the pitch post-filter 21 may reduce the size of quantization noise that is generated in valleys between harmonic components. The pitch pre-filter 11 and the pitch post-filter 21 achieve a sort of noise shaping. The pitch pre-filter 11 and the pitch post-filter 21 will now be described in greater detail with reference to FIGS. 2 and 3.

FIG. 2 is a block diagram of the audio encoding apparatus 10 that performs pitch pre-filtering.

Referring to FIG. 2, the pitch pre-filter 11 of the audio encoding apparatus 10 may include a pre-emphasis unit 12, a pitch detector 13, and a comb filter 14. Since an encoder 15 of FIG. 2 corresponds to the encoder 15 of FIG. 1, a repeated description thereof will be omitted.

The pre-emphasis unit 12 may emphasize important frequency components of an input signal. The pre-emphasis unit 12 may emphasize frequency components belonging to a certain band by increasing the magnitudes of the frequency components in the certain band so that the magnitudes thereof are greater than magnitudes of the other frequency components which do not belong to the certain band. Alternatively, the pre-emphasis unit 12 may emphasize frequency components belonging to the certain band by filtering out the other frequency components from the input signal.

Components included in a low frequency band of an audio signal changes little with time in comparison to components included in a high frequency band of the audio signal. Thus, when an audio signal is processed, to extract a pitch component from the audio signal, it is necessary to emphasize the components included in the high frequency band of the audio signal. The audio encoding apparatus 10 may remove components included in low frequency bands by using a high pass filter as the pre-emphasis unit 12. The pre-emphasis unit 12 implemented using a high pass filter may be represented as:

$$y[n]=x[n]-a\times x[n-1] \qquad \text{[Equation 1]}$$

where x[n] represents a signal currently input to the pre-emphasis unit 12, x[n−1] represents a signal previously input to the pre-emphasis unit 12, y[n] represents an output signal of the pre-emphasis unit 12, and a represents a filter coefficient that may range from 0.9 to 1.

The pitch detector 13 may detect a pitch of an audio signal output from the pre-emphasis unit 12 by using various pitch detection algorithms.

The comb filter 14 may determine a filter coefficient based on the detected pitch. The comb filter 14 may apply comb filtering to the input audio signal by using the determined filter coefficient. For example, the comb filter 14 may boost valleys between pitch harmonic components in the frequency domain. Alternatively, the comb filter 14 may suppress pitch harmonic peaks in the frequency domain.

FIG. 3 is a block diagram of the audio decoding apparatus 20 that performs pitch post-filtering.

Referring to FIG. 3, the pitch post-filter 21 of the audio decoding apparatus 20 may include a comb filter 24 and a de-emphasis unit 22. Since a decoder 25 of FIG. 3 corresponds to the decoder 25 of FIG. 1, a repeated description thereof will be omitted.

The comb filter 24 of FIG. 3 may be an inverse filter of the comb filter 14 of FIG. 2. Thus, the comb filter 24 may attenuate valleys between pitch harmonic components in the frequency domain. Alternatively, the comb filter 24 may boost pitch harmonic peaks in the frequency domain.

Since the de-emphasis unit 22 is complementary to the pre-emphasis unit 12, the de-emphasis unit 22 may be an inverse filter of the pre-emphasis unit 12. The de-emphasis unit 22 compensates for the frequency components emphasized by the pre-emphasis unit 12 of the audio encoding apparatus 10. In other words, the de-emphasis unit 22 may reduce the magnitudes of frequency components belonging to a certain band so that the magnitudes thereof are smaller than magnitudes of the other frequency components.

Embodiment 1

The audio encoding apparatus 10 of the general audio codec system 30 of FIGS. 1 through 3 detects a pitch of the input audio signal pre-emphasized by the pre-emphasis unit 12 in order to achieve accurate pitch detection. The audio encoding apparatus 10 performs comb filtering by using the filter coefficient determined based on the detected pitch. The audio encoding apparatus 10 encodes the input audio signal, in a frequency domain, pre-emphasized by the pre-emphasis unit 12 to produce a bit stream. Then, the audio encoding apparatus 10 transmits the bit stream to the audio decoding apparatus 20.

The audio decoding apparatus 20 of the general audio codec system 30 performs frequency-domain decoding, comb filtering, and de-emphasis on the bit stream received from the audio encoding apparatus 10.

According to the general audio codec system 30, the pre-emphasized audio signal undergoes comb filtering, and a signal resulting from the comb filtering undergoes encoding, decoding, and de-emphasis. Thus, the output audio signal output by the general audio codec system 30 has errors accumulated via pre-emphasis and de-emphasis.

According to the general audio codec system 30, coding errors occur in the audio signal as the audio signal passes through the audio encoding apparatus 10 and the audio decoding apparatus 20. Since a signal obtained via pre-emphasis, comb filtering, encoding, and decoding has coding errors, the signal is different from the audio signal input to the audio encoding apparatus 10. Accordingly, even when the bit stream input to the audio decoding apparatus 20 undergoes de-emphasis in the de-emphasis unit 22, the audio decoding apparatus 20 may not output the exact original audio signal.

In an audio encoding apparatus and method and an audio decoding apparatus and method according to an embodiment of the present invention, pre-emphasis on an audio signal may be selectively applied, thereby addressing the above-described problem and enhancing quality of a reconstructed audio signal.

FIG. 4A is a block diagram of an audio encoding apparatus 100 according to an embodiment of the present invention.

Referring to FIG. 4A, the audio encoding apparatus 100 may include a filtering unit 140 and an encoder 150.

The filtering unit 140 is configured to reduce coding distortion that occurs in a periodic audio signal. The filtering unit 140 may include a pitch detector 120 and a second filter 130.

The pitch detector 120 detects a pitch of an audio signal. Detecting a pitch of an audio signal may include acquiring information about the pitch from each frame of the audio signal, wherein the audio signal is split into frames. Detecting a pitch of an audio signal may also include determining a filter coefficient of the second filter 130, which will be described later. For example, the pitch detector 120 may acquire, from the audio signal, at least one of a pitch period, a pitch gain, a pitch tap, and a flag indicating whether or not the second filter 130 has been applied.

The second filter 130 determines the filter coefficient based on the pitch detected by the pitch detector 120. The second filter 130 performs second filtering with respect to the audio signal based on the determined filter coefficient. Based on the information about the pitch detected by the pitch detector 120, a gain of the second filter 130 may be determined. For example, the second filter 130 may perform comb filtering with respect to the audio signal, but embodiments of the present invention are not limited thereto.

For example, when the second filter 130 is an all-zero comb filter, a transfer function Hpre(z) of the second filter 130 may be represented as:

$$H_{pre}(z)=(1-bz^{-p}) \quad \text{[Equation 2]}$$

where p represents a pitch period obtained from an audio signal and b represents a pitch tap obtained from the audio signal. In Equation 2, b is chosen to be 0≤<b<1. If it is determined that the audio signal does not have sufficient periodicity, b may be 0. The more periodic the audio signal is, the closer b is to 1.

According to an embodiment of the present invention, the second filter 130 may be selectively used by a user to encode the audio signal. In this case, a separate switch (not shown) may be further provided. In the case where the second filter 130 is selectively used, in order for an audio decoding apparatus 200 of FIG. 5 to perform a process corresponding to second filtering performed by the second filter 130, the pitch detector 120 may produce a flag representing whether the second filter 130 has been applied and may transmit the flag to the audio decoding apparatus 200. In other words, the pitch detector 120 may determine whether the second filter 130 is to perform second filtering on the audio signal, based on the audio signal. The pitch detector 120 may transmit a flag representing a result of the determination to the audio decoding apparatus 200. For example, the flag representing use or non-use of the second filter 130 may be included in a header of a bit stream and may then be transmitted.

The encoder 150 encodes an audio signal resulting from the second filtering. The encoder 150 may produce and output a bit stream including the audio signal resulting from the second filtering.

In detail, the encoder 150 may perform a frequency transformation on each of a plurality of windows included in the audio signal resulting from the second filtering. The encoder 150 may produce frequency transform coefficients by performing time-to-frequency transformation, namely, time-to-frequency mapping, on the audio signal resulting from the second filtering. The frequency transform on the audio signal may be achieved via Quadrature Mirror Filterbank (QMF), Modified Discrete Fourier Transform (MDCT), Fast Fourier Transform (FFT), or the like, but embodiments of the present invention are not limited thereto.

The encoder 150 may quantize the transform coefficients. The encoder 150 may perform noiseless coding and bit stream packing on the quantized transform coefficients to produce and output an encoded bit stream.

The encoder 150 may produce a bit stream including both the audio signal resulting from the second filtering and the information about the pitch. Pitch filtering performed by the filtering unit 140 is a method of filtering out a time period, namely, a pitch, from an audio signal to increase encoding efficiency. Accordingly, if an existing codec is intended for pitch filtering, a method of maintaining compatibility between the existing codec and a codec using pitch filtering is needed. The encoder 150 according to the present embodiment may produce and output a bit stream that includes the information about the pitch in the auxiliary area thereof.

Due to latency occurring during audio encoding, a frame via which the information about the pitch is transmitted may be different from a frame via which the audio signal is transmitted. Thus, the encoder 150 may delay and output the information about the pitch so that the information about the pitch which is being output is in sync with a frame being decoded. For example, when the audio encoding apparatus 100 uses a 50% overlap window, the encoder 150 may delay the information about the pitch by one frame. In this case, the audio encoding apparatus 100 may produce a bit stream including the audio signal resulting from the second filtering and delayed information about the pitch. A method of outputting the delayed information about the pitch will be described in greater detail later with reference to FIGS. 8 through 13. Although FIGS. 9 through 13 are related to embodiment 2 of the present invention, they may be applied to embodiment 1 of the present invention.

According to the present embodiment, the audio encoding apparatus 100 may reduce complexity that occurs during pre-emphasis. According to another embodiment, the audio encoding apparatus 100 may reduce coding errors by encoding the original audio signal instead of a pre-emphasized audio signal.

Referring to FIG. 4B, which is another embodiment of the present invention, a filtering unit 140 may further include a first filter 110 in addition to the pitch detector 120 and the second filter 130. Since the pitch detector 120, the second filter 130, and an encoder 150 of FIG. 4B correspond to the pitch detector 120, the second filter 130, and the encoder 150 of FIG. 4A, respectively, a repeated description thereof will be omitted.

The first filter 110 performs first filtering on an audio signal. The first filter 110 processes the audio signal so that pitch detection may be performed on the audio signal. For example, the first filter 110 may perform pre-emphasis on the audio signal to emphasize a certain frequency band of the audio signal. Pre-emphasis may include increasing the magnitudes of the frequency components belonging to a certain band so that the magnitudes thereof are greater than magnitudes of the other frequency components which do not belong to the certain band. Alternatively, pre-emphasis may include reducing the magnitudes of the other frequency components so that the magnitudes of the other frequency components are smaller than the magnitudes of the frequency components belonging to the certain band.

If the first filter 110 performs pre-emphasis, the audio encoding apparatus 100 of FIG. 4B may detect a pitch of a pre-emphasized audio signal and encode the original audio signal that is not subject to pre-emphasis, thereby increasing the accuracy of pitch detection and also reducing coding errors.

The pitch detector 120 detects a pitch of an audio signal resulting from the first filtering by the first filter 110. The second filter 130 determines a filter coefficient based on the pitched detected by the pitch detector 120. The second filter 130 performs second filtering with respect to the audio signal based on the determined filter coefficient.

FIG. 5 is a block diagram of an audio decoding apparatus 200 according to an embodiment of the present invention.

Referring to FIG. 5, the audio decoding apparatus 200 includes a decoder 250 and a filter 240.

The decoder 250 receives and decodes a bit stream. The received bit stream may be a bit stream produced by detecting a pitch of the original audio signal, performing second filtering on the original audio signal based on the detected pitch, and encoding an audio signal resulting from the second filtering. Alternatively, the received bit stream may be a bit stream produced by performing first filtering on the original audio signal, detecting a pitch of an audio signal resulting from the first filtering, performing second filtering on the original audio signal based on the detected pitch, and encoding an audio signal resulting from the second filtering. Thus, the bit stream which is received at the decoder 250 includes the encoded audio signal. The received bit stream may include the information about the pitch that was used by the filtering unit 140 of the audio encoding apparatus 100 during pitch filtering.

In detail, the decoder 250 produces frequency transform coefficients by dequantizing the received bit stream. The decoder 250 may inversely transform the frequency transform coefficients via frequency-to-time transformation, namely, frequency-to-time mapping, to produce and output a decoded signal. The frequency-to-time transformation may be Inverse QMF (IQMF), Inverse MDFT (IMDCT), Inverse FFT (IFFT), or the like, but embodiments of the present invention are not limited thereto.

The filter 240 filters the decoded signal produced by the decoder 250. The filter 240 may perform inverse filtering of the second filtering performed to produce the bit stream, with respect to the decoded signal. The filter 240 may extract the information about the pitch from the received bit stream and perform a process corresponding to the second filtering performed by the audio encoding apparatus 100 based on the information about the pitch extracted from the received bit stream. In other words, the filter 240 may reconstruct the periodic components removed by the audio encoding apparatus 100, based on parameters included in the received bit stream.

The information about the pitch used by the filter 240 may include at least one of a pitch period, a pitch gain, a pitch tap, and a flag indicating whether or not the second filter 130 has been applied.

According to an embodiment of the present invention, the filter 240 may be selectively used to decode the audio signal. The filter 240 may be selectively used based on the flag that is included in the received bit stream and indicates whether or not the second filter 130 has been applied to the encoded signal which is included in the received bit stream. For example, the flag representing whether or not the second filter 130 has been applied may be included in a header of the bit stream and may then be transmitted along with the bit stream. The filter 240 may perform a process based on whether the second filtering has been performed by the audio encoding apparatus 100, based on the flag representing whether or not the second filter 130 has been applied. Thus, the filter 240 may or may not be used based on whether the second filter 130 was used when the audio encoding apparatus 100 encoded the audio signal.

The filter 240 may perform comb filtering on the decoded signal, but embodiments of the present invention are not limited thereto. For example, when the second filter 130 of the audio encoding apparatus 100 is an all-zero comb filter, a transfer function Hpre(z) of the filter 240 of the audio decoding apparatus 200 may be represented as:

$$H_{post(z)} = \frac{1}{(1 - bz^{-p})} \quad \text{[Equation 3]}$$

where p represents a pitch period obtained from an audio signal and b represents a pitch tap obtained from the audio signal. In Equation 3, b is chosen to be $0 \le b < 1$. When no sufficient periodicity is detected from the audio signal, b may be 0. The more periodic the audio signal is, the closer b is to 1.

As described above, the audio encoding apparatus 100 and the audio decoding apparatus 200 according to an embodiment of the present invention may reduce the complexity of an audio codec system by omitting a pre-emphasis operation and a de-emphasis operation. The audio encoding apparatus 100 may encode the original audio signal instead of a pre-emphasized audio signal, thereby reducing coding errors and thus enhancing the quality of a reconstructed audio signal. The audio encoding apparatus 100 may secure the accuracy of pitch detection by using the pre-emphasized audio signal during pitch detection, and may also enhance the quality of the reconstructed audio signal by using the original audio signal during encoding.

An audio encoding method according to an embodiment of the present invention includes operations performed by the audio encoding apparatus 100 of FIG. 4A.

The audio encoding apparatus 100 may detect a pitch of an audio signal and determine a filter coefficient based on the detected pitch. The audio encoding apparatus 100 may perform second filtering on the audio signal based on the determined filter coefficient and encode an audio signal resulting from the second filtering.

FIG. 6 is a flowchart of an audio encoding method according to another embodiment of the present invention.

Referring to FIG. 6, the audio encoding method includes operations performed by the audio encoding apparatus 100 of FIG. 4B. Thus, although omitted hereinafter, descriptions of the audio encoding apparatus 100 of FIG. 4B may still be applied to the audio encoding method of FIG. 6.

In operation S610, the audio encoding apparatus 100 of FIG. 4B may perform first filtering on an audio signal. The audio encoding apparatus 100 of FIG. 4B may perform pre-emphasis to emphasize a certain frequency band of the audio signal. In other words, the audio encoding apparatus 100 of FIG. 4B may perform pre-emphasis to increase the magnitudes of the frequency components belonging to a certain band included in the audio signal so that the magnitudes thereof are greater than those of the other frequency components or to reduce the magnitudes of the other frequency components.

In operation S620, the audio encoding apparatus 100 may detect a pitch of an audio signal resulting from the first filtering. The audio encoding apparatus 100 may acquire information about the pitch from each of a plurality of frames of the audio signal into which the audio signal has been split. The audio encoding apparatus 100 may acquire, as the information about the pitch, at least one of a flag indicating whether or not the second filtering has been performed, a pitch period, a pitch gain, and a pitch tap, from the audio signal.

In operation S630, the audio encoding apparatus 100 may determine a filter coefficient based on the detected pitch.

In operation S640, the audio encoding apparatus 100 may perform second filtering on the audio signal based on the determined filter coefficient. For example, the audio encoding apparatus 100 may perform comb filtering as the second filtering on the audio signal.

In operation S650, the audio encoding apparatus 100 may encode an audio signal resulting from the second filtering. The audio encoding apparatus 100 may produce and output a bit stream that includes both the audio signal resulting from the second filtering and the information about the pitch. For example, the information about the pitch may be included in an auxiliary area of the bit stream. The audio encoding apparatus 100 may delay the information about the pitch by one frame and output delayed information about the pitch. The audio encoding apparatus 100 may produce and output a bit stream that includes both the audio signal resulting from the second filtering and the delayed information about the pitch.

FIG. 7 is a flowchart of an audio decoding method according to an embodiment of the present invention.

Referring to FIG. 7, the audio decoding method includes operations performed by the audio decoding apparatus 200 of FIG. 5. Thus, although omitted hereinafter, descriptions of the audio decoding apparatus 200 of FIG. 5 may still be applied to the audio decoding method of FIG. 7.

In operation S710, the audio decoding apparatus 200 receives an encoded signal. For example, the audio decoding apparatus 200 may receive an encoded signal which is included in a bit stream. The encoded signal may be a signal produced by detecting a pitch of the original audio signal, performing second filtering on the original audio signal based on the detected pitch, and encoding an audio signal resulting from the second filtering. Alternatively, the encoded signal may be a signal produced by performing first filtering on the original audio signal, detecting a pitch of an audio signal resulting from the first filtering, performing second filtering on the original audio signal based on the detected pitch, and encoding an audio signal resulting from the second filtering. The audio decoding apparatus 200 may receive an encoded signal including information about the pitch acquired from the audio signal resulting from the first filtering.

In operation S720, the audio decoding apparatus 200 decodes the received encoded signal.

In operation S730, the audio decoding apparatus 200 filters a decoded signal resulting from the decoding. In this case, the audio decoding apparatus 200 may perform inverse filtering of the second filtering that was performed during encoding performed to produce the encoded signal. The inverse filtering of the second filtering may be complementary to the second filtering. The audio decoding apparatus 200 may extract the information about the pitch from the received encoded signal. The audio decoding apparatus 200 may determine a filter coefficient for filtering the decoded signal, based on the information about the pitch. The audio decoding apparatus 200 may perform filtering on the decoded signal, based on the determined filter coefficient.

Embodiment 2

In the audio codec system 30 of FIGS. 1 through 3, the audio encoding apparatus 10 may acquire the information of the pitch and perform windowing by using a low overlap window or a 50% overlap window and perform frequency-domain encoding. Windowing denotes dividing an audio signal into small sets in order to perform frequency-domain encoding.

FIGS. 8A through 8E are diagrams for explaining a delay that occurs in the general audio codec system 30. FIGS. 8A through 8E illustrate a case where an audio signal including (N−2)th, (N−1)th, N-th, and (N1+1)th frames is encoded and decoded.

FIG. 8A illustrates an audio signal input to the audio encoding apparatus 10. FIG. 8B illustrates pitch detection performed by the pitch pre-filter 11. FIG. 8C illustrates encoding of the audio signal and information about the pitch performed by the encoder 15.

Referring to FIG. 8B, the pitch pre-filter 11 detects a pitch of a current frame 801. The pitch pre-filter 11 acquires pitch information N+1 from the current frame 801. The audio encoding apparatus 10 acquires information about a pitch from the audio signal, applies a window 804 to the audio signal, and then performs a frequency transform to perform frequency-domain encoding. Accordingly, as illustrated in FIG. 8C, the audio encoding apparatus 10 encodes both the current frame 801 and the pitch information N+1 and transmits a result of the encoding to the audio decoding apparatus 20.

In the audio codec system 30 of FIGS. 1 through 3, the audio decoding apparatus 20 inversely transforms quantized transform coefficients included in a compressed bit stream to produce and output a decoded signal.

FIG. 8D illustrates decoding performed by the decoder 25. FIG. 8E illustrates filtering performed by the pitch post-filter 21. As illustrated in FIG. 8D, the audio decoding apparatus 20 may decode the audio signal by using a window 805 having the same size as the window 804 applied by the audio encoding apparatus 10. The audio decoding apparatus 20 needs to wait for a next frame 803 that overlaps with a current frame 802, in order to inversely transform the current frame 802. In other words, a time delay occurs due to the wait for an overlapping section. For example, as illustrated in FIG. 8E, if a 50% overlap window is applied, delay by one frame occurs.

As illustrated in FIGS. 8A through 8E, the audio encoding apparatus 10 transmits information about a pitch extracted from a frame together with the frame to the audio decoding apparatus 20. However, the audio decoding apparatus 20 uses the information about the pitch to decode a frame occurring prior to the frame. As illustrated in FIG. 8E, the audio decoding apparatus 20 uses the pitch information N+1 to decode the current frame 802. The pitch information N+1 is information obtained from the next frame 803, which is the next frame of the current frame 802, by the audio encoding apparatus 10.

As illustrated in FIG. 8C, a frame via which the audio encoding apparatus 10 transmits the information about the pitch is the same as a frame via which the audio encoding apparatus 10 transmits a frequency-transformed audio signal. However, when frequency-domain decoding is performed, a decoding delay occurs. Thus, the audio decoding apparatus 20 decodes a frame by using information about the pitch which has been acquired from a previous frame of the frame being decoded.

Therefore, when information about a pitch is applied to a decoded audio signal, the information about the pitch needs to be transmitted based on decoding delay in order to increase the quality of a reconstructed audio signal. In other words, a method is needed in which information about a pitch is used at a point in time when a frame from which the information about the pitch is extracted is decoded.

In an audio encoding apparatus and method and an audio decoding apparatus and method according to an embodiment of the present invention, information about a pitch is transmitted based on the point in time when a frame from which the information about the pitch is acquired is decoded, thereby addressing the above-described problem and enhancing the audio quality of a reconstructed audio signal.

FIG. 9 is a block diagram of an audio encoding apparatus 500 according to another embodiment of the present invention.

Referring to FIG. 9, the audio encoding apparatus 500 includes a pre-filter 510 and an encoder 550.

The pre-filter 510 is configured to reduce coding distortion that noticeably occurs during encoding and decoding of a periodic audio signal. The pre-filter 510 acquires information about a pitch from an input audio signal. The pre-filter 510 may perform pre-filtering on the input audio signal by using the information about the pitch. For example, pre-filtering may be an operation of boosting valleys between pitch harmonic components in the frequency domain or suppressing pitch harmonic peaks.

The pre-filter 510 may include the pitch pre-filter 11 of FIGS. 1 and 2. Alternatively, the pre-filter 510 may include the filtering unit 140 of FIG. 4A or 4B. A repeated description thereof will be omitted.

The pre-filter 510 may perform first filtering on the input audio signal and acquire information about a pitch from an audio signal resulting from the first filtering. The pre-filter 510 may acquire information about a pitch from each frame of the audio signal, wherein the audio signal is split into frames. The pre-filter 510 may determine a filter coefficient based on the information about the pitch and perform second filtering on the input audio signal by using the determined filter coefficient.

The encoder 550 may perform windowing on a pitch-filtered audio signal by using a window which has an overlapping section. The encoder 550 may encode an audio signal resulting from the windowing and the information about the pitch, based on the overlapping section of the window. Encoding the information about the pitch based on the overlapping section of the window includes determining decoding delay based on the overlapping section of the window, delaying the information about the pitch according to the determined decoding delay, and encoding the delayed information about the pitch. The encoder 550 may produce and output a bit stream including both an encoded audio signal and encoded information about the pitch.

The encoder 550 may determine the encoding delay based on the overlapping section of the window. When the length of a window used during encoding is equal to that of a window used during decoding and the overlapping sections of the two windows are equal in length, the encoder 550 may calculate a latency time that is generated during decoding, based on the overlapping section of the window used during encoding.

The encoder 550 may delay the information about the pitch according to the determined encoding delay to output delayed information of the pitch. To this end, the encoder 550 may include a buffer (not shown) that stores the information about the pitch for the determined encoding delay and then outputs the delayed information. For example, when the length of an overlapping section of a window is 50% or more of the window, the encoder 550 may delay the information about the pitch by one frame and output the delayed information, based on the overlapping section. As another example, when the length of an overlapping section of a window is less than 50% of the window, the encoder 550 may delay the information about the pitch by a time period shorter than one frame and output the delayed information, based on the overlapping section.

FIGS. 11A through 11E are diagrams for explaining a method in which an audio codec system according to an embodiment of the present invention transmits information about a pitch based on a point in time when a frame is decoded. FIGS. 11A through 11E illustrate a case where an audio signal including (N−2)th, (N−1)th, N-th, and (N1+1)th frames is encoded and decoded.

FIG. 11A illustrates an audio signal input to the audio encoding apparatus 500. FIG. 11B illustrates pitch detection performed by the pre-filter 510. FIG. 11C illustrates encoding of the audio signal and information about a pitch performed by the encoder 550.

Referring to FIG. 11B, the pre-filter 510 detects a pitch of a current frame 1101. The pitch pre-filter 510 acquires pitch information N+1 from the current frame 1101.

The audio encoding apparatus 500 acquires information about a pitch of the audio signal, applies a window 1104 to the audio signal, and then performs a frequency transform to perform frequency-domain encoding. The encoder 550 determines a decoding delay based on an overlapping section of a window, delays the information about the pitch according to the determined decoding delay, and encodes delayed information about the pitch. As illustrated in FIGS. 11A through 11E, when the audio codec system uses a 50% overlap window, the audio codec system may delay the information about the pitch by one frame and output delayed information about the pitch. Referring to FIG. 11C, when the encoder 550 encodes the current frame 1101 and outputs a bit stream including the encoded current frame 1101, the encoder 550 outputs pitch information N delayed by one frame together with the current frame 1101, instead of outputting the pitch information N+1 corresponding to the current frame 1101 together with the current frame 1101.

When the audio encoding apparatus 500 outputs a bit stream including information about a pitch, the audio encoding apparatus 500 may store information about a pitch in a buffer based on decoding delay and output delayed information about the pitch.

The encoder 550 may produce a bit stream so that information about a pitch is included in an auxiliary area of the bit stream, so that compatibility between ABC and an existing audio codec (for example, an Advanced Audio Coding (AAC) codec, an MPEG-1 Audio Layer-3 (MP3) codec, an AAC Enhanced Low Delay (AAC ELD) codec, or the like) may be achieved.

The information about the pitch may include at least one of a flag indicating whether or not the pre-filter 510 has been applied, a pitch period, a pitch gain, and a pitch tap. The flag indicating whether or not the pre-filter 510 has been applied denotes a flag indicating whether pre-filtering has been performed so that an audio decoding apparatus 600, which will be described later, may perform a process which corresponds to the pre-filtering.

FIGS. 14A through 14E are diagrams for explaining a structure of a bit stream including information about a pitch, according to an embodiment of the present invention.

Referring to FIG. 14A, a general bit stream may include a header 1401, an additional information area 1402, a raw data area 1403, and an auxiliary area 1404.

For example, as illustrated in FIG. 14B, the encoder 550 according to another embodiment of the present invention may produce and output a bit stream including pitch information 1410 next to the header 1401. Alternatively, as illustrated in FIG. 14C, the encoder 550 according to another embodiment of the present invention may produce and output a bit stream including the pitch information 1410 next to the additional information area 1402. Alternatively, as illustrated in FIG. 14D, the encoder 550 according to another embodiment of the present invention may produce and output a bit stream including the pitch information 1410 next to the raw data area 1403. Alternatively, as illustrated in FIG. 14E, the encoder 550 according to another embodiment of the present invention may produce and output a bit stream including the pitch information 1410 in the auxiliary area 1404.

The encoder 550 may produce and output a bit stream such that the flag indicating whether or not pre-filtering at the pre-filter 510 has been performed to produce the bit stream is included in a header of the bit stream. And the encoder 550 may produce and output the bit stream such that information about a pitch other than the flag is included in an area of the bit stream as illustrated in FIG. 14B, 14C, 14D, or 14E.

In other words, the encoder 550 may produce and output a bit stream so that the information about a pitch other than the flag indicating whether or not the pre-filter 510 has been applied is located next to at least one of the header, the additional information area, and the raw data area.

FIG. 15A illustrates a structure of a bit stream for use in an AC-3 codec, and FIG. 15B illustrates a structure of a bit stream for use in an E-AC3 codec. In the AC-3 codec and the E-AC3 codec using the bit stream structures of FIGS. 15A and 15B, the encoder 550 may produce and output a bit stream such that information about a pitch is included in an addbsi (additional information) field of a bit stream information (BSI) field, skipfld (padding bytes) of audio block fields AB0 to AB5, or an auxiliary area AUX of the bit stream. The audio encoding apparatus 500 is not limited to the aforementioned example, and may produce and output a bit stream including pitch information in various predetermined areas. Thus, the audio encoding apparatus 500 is compatible with various codecs such as a Constrained Energy Lapped Transform (CELT) codec, an AAC codec, an MP3 codec, an AAC ELD codec, an AC-3 codec, and an E-AC3 codec.

FIG. 10 is a block diagram of an audio decoding apparatus 600 according to another embodiment of the present invention.

Referring to FIG. 10, the audio decoding apparatus 600 includes a decoder 650 and a post-filter 610.

The decoder 650 receives and decodes a compressed audio bit stream. The decoder 650 acquires a frequency-transformed audio signal and information about a pitch of the received compressed audio bit stream. The decoder 650 inversely transforms the frequency-transformed audio signal and performs windowing on an audio signal resulting from the inverse transformation by using a window having a certain overlapping section. The decoder 650 may perform windowing by using a window having the same size as the window used by the audio encoding apparatus 500 to perform windowing.

The post-filter 610 of the audio decoding apparatus 600 may correspond to the pre-filter 510 of the audio encoding apparatus 500. The post-filter 610 is configured to reduce coding distortion that noticeably occurs during encoding and decoding of a periodic audio signal. The post-filter 610 may perform a process corresponding to the pre-filtering performed by the audio encoding apparatus 500, based on the information about the pitch extracted from the received compressed audio bit stream. In other words, the post-filter 610 may reconstruct periodic components removed by the audio encoding apparatus 500, based on parameters included in the received compressed audio bit stream. For example, the information about the pitch may be included in an auxiliary area of the received compressed audio bit stream.

The information about the pitch may be information delayed according to an encoding delay determined based on the overlapping section of a window, as described above with reference to the audio encoding apparatus 500. The information about the pitch may include at least one of a pitch period, a pitch gain, a pitch tap, and a flag indicating whether pre-filtering has been performed.

The post-filter 610 may perform post-filtering on an audio signal resulting from the windowing, by using the information about the pitch. The post-filter 610 may determine a filter coefficient based on the information about the pitch. The post-filter 610 may perform post-filtering on a decoded audio signal received from the decoder 650, based on the determined filter coefficient. The post-filtering may be an operation of suppressing valleys between pitch harmonic components in the frequency domain or boosting pitch harmonic peaks.

The post-filtering may correspond to the pre-filtering performed during encoding. Thus, according to an embodiment, the audio decoding apparatus 600 may selectively perform the post-filtering by referring to the flag that is included in a header of the received compressed audio bit stream and indicates whether or not the pre-filtering has been performed.

The post-filter 610 may include the pitch post-filter 21 of FIGS. 1 and 3. Alternatively, the post-filter 610 may include the filter 240 of FIG. 5. A repeated description thereof will be omitted.

FIG. 11D illustrates decoding performed by the decoder 650 of FIG. 10. FIG. 11E illustrates filtering performed by the post-filter 610 of FIG. 10. As illustrated in FIG. 11D, the audio decoding apparatus 600 may decode an audio signal by using a window 1105 having the same size as the window 1104 applied by the audio encoding apparatus 500. The audio decoding apparatus 600 needs to wait for a next frame 1103 that overlaps with a current frame 1102, in order to inversely transform the current frame 1102. In other words, a time delay occurs according to an overlapping section. For example, as illustrated in FIG. 11D, if a 50% overlap window is applied, delay by one frame occurs.

Thus, as illustrated in FIG. 11E, the audio decoding apparatus 600 uses pitch information N corresponding to the current frame 1102 when decoding the current frame 1102. The pitch information N is information that the audio encoding apparatus 500 has acquired from an N-th frame, namely, the current frame 1102.

According to the audio encoding apparatus 500 and the audio decoding apparatus 600, information about a pitch exactly corresponding to a frame being decoded by the audio decoding apparatus 600 may be used during decoding of the frame. Thus, according to an embodiment of the present invention, the audio quality of a reconstructed audio signal may be enhanced.

As described above, the audio encoding apparatus 500, which is included in the audio codec system according to an embodiment of the present invention, transmits information about a pitch based on encoding delay. Accordingly, the audio decoding apparatus 600, which is included in the audio codec system according to an embodiment of the present invention, may receive information about a pitch in sync with a frame being decoded. Thus, the audio codec system according to an embodiment of the present invention may support a random access to frames included in an encoded audio signal. Moreover, when an encoded audio signal has been damaged, the audio codec system according to an embodiment of the present invention may decode an errorless frame by using information about a pitch exactly corresponding to the errorless frame.

FIG. 12 is a flowchart of an audio encoding method according to another embodiment of the present invention.

Referring to FIG. 12, the audio encoding method includes operations performed by the audio encoding apparatus 500 of FIG. 8. Thus, although omitted hereinafter, descriptions of the audio encoding apparatus 500 of FIG. 8 may still be applied to the audio encoding method of FIG. 12.

In operation S1210, the audio encoding apparatus 500 may perform pre-filtering on an audio signal by using information about a pitch acquired from the audio signal. As described above with reference to the audio encoding apparatuses 100 of FIGS. 4A and 4B, the audio encoding apparatus 500 may selectively perform pre-emphasis on the audio signal.

In other words, the audio encoding apparatus 500 may perform first filtering on the audio signal and acquire information about a pitch from an audio signal resulting from the first filtering. The first filtering is an operation of emphasizing a signal belonging to a certain frequency band, in order to acquire information about a pitch from the audio signal. The audio encoding apparatus 500 may determine a filter coefficient based on the acquired information about the pitch and perform second filtering on the audio signal by using a second filter designed using the determined filter coefficient. For example, the second filtering may include comb filtering.

The audio encoding apparatus 500 may acquire information about a pitch from each of a plurality of frames of the audio signal into which the audio signal has been split.

In operation S1220, the audio encoding apparatus 500 may perform windowing on an audio signal resulting from the pre-filtering, by using a window having a certain overlapping section.

In operation S1230, the audio encoding apparatus 500 may encode an audio signal resulting from the windowing and the information about the pitch, based on the overlapping section of the window. The audio encoding apparatus 500 may produce and output a bit stream by encoding the audio signal resulting from the windowing and the information about the pitch.

The audio encoding apparatus 500 may determine encoding delay based on the overlapping section of the window, delay the information about the pitch according to the determined encoding delay, and output delayed information about the pitch. For example, when the length of the overlapping section of the window is 50% or more of the window, the audio encoding apparatus 500 may delay the information about the pitch by one frame.

The audio encoding apparatus 500 may produce and output a bit stream including the information about the pitch located in an auxiliary area thereof. The information about the pitch may include at least one of a pitch period, a pitch gain, a pitch tap, and a flag indicating whether the pre-filtering has been performed. For example, the audio encoding apparatus 500 may produce and output a bit stream such that a flag indicating whether the pre-filtering has been performed is located in the header thereof and at least one of a pitch period, a pitch gain, and a pitch tap is located in an auxiliary area thereof.

FIG. 13 is a flowchart of an audio decoding method according to another embodiment of the present invention.

Referring to FIG. 13, the audio decoding method includes operations performed by the audio decoding apparatus 600 of FIG. 9. Thus, although omitted hereinafter, descriptions of the audio decoding apparatus 600 of FIG. 9 may still be applied to the audio decoding method of FIG. 13.

In operation S1310, the audio decoding apparatus 600 acquires a frequency-transformed audio signal and information about a pitch of a received bit stream. The information about the pitch received by the audio decoding apparatus 600 may be information that has been delayed based on the overlapping section of a window applied during encoding or decoding.

In operation S1320, the audio decoding apparatus 600 acquires time-domain audio signal samples by inversely transforming the frequency-transformed audio signal.

In operation S1330, the audio decoding apparatus 600 performs windowing on an audio signal resulting from the inverse transformation by using a window having a certain overlapping section.

In operation S1340, the audio decoding apparatus 600 performs post-filtering on an audio signal resulting from the windowing by using the information about the pitch. The post-filtering performed by the audio decoding apparatus 600 may correspond to the pre-filtering performed by the audio encoding apparatus 500. When post-filtering corresponds to pre-filtering, this may mean that the post-filtering is the inverse of the pre-filtering. The audio decoding apparatus 600 may extract the information about the pitch of an auxiliary area of the received bit stream. The information about the pitch may include at least one of a flag indicating application or non-application of pre-filtering, a pitch period, a pitch gain, and a pitch tap.

FIG. 16 is a block diagram of an audio encoding apparatus 1600 using a psychoacoustic model, according to an embodiment of the present invention.

Referring to FIG. 16, the audio encoding apparatus 1600 may include a psychoacoustic model unit 1650.

A pitch pre-filter 1610 of FIG. 16 may correspond to the filtering unit 140 of FIG. 4 or the pre-filter 510 of FIG. 9. Thus, a repeated description thereof will be omitted.

A windowing unit 1620, a frequency transformer 1630, a quantizer 1640, the psychoacoustic model unit 1650, an entropy encoder 1660, and a bit stream former 1670 of FIG. 16 may correspond to the encoder 150 of FIG. 4 or the encoder 550 of FIG. 9.

The windowing unit 1620 may split an input audio signal into windows. The length of a frame of a window may vary according to an application applied to the audio encoding apparatus 1600.

The frequency transformer 1630 may perform time-to-frequency transform on each of a plurality of windows into which the audio signal has been split. The frequency transformer 1630 may produce transform coefficients by performing the time-to-frequency transform on the windows. The time-to-frequency transform may be achieved via QMF, MDCT, FFT, or the like, but embodiments of the present invention are not limited thereto.

The psycho-acoustic model unit 1650 may set a masking threshold by applying a masking effect to the input audio signal.

The masking effect is based on psychoacoustic theory, and uses the characteristics that a human auditory system does not properly perceive small signals adjacent to a large signal because the small signals are masked by the large signal. For example, in noisy spaces like bus stations, people are unable to hear conversations that are otherwise audible in quiet places.

A masking threshold is the minimum level at which an audio signal is audible. According to the masking effect, an audio signal that exists below the masking threshold is inaudible.

In applying a psychoacoustic model to one of a plurality of windows into which an audio signal is split, a signal having the largest magnitude among signals in the window may exist in a middle frequency scale factor band among a plurality of frequency scale factor bands. And several signals having much smaller magnitudes than the largest signal may exist in frequency scale factor bands around the middle frequency scale factor band. The largest signal is a masker, and a masking curve is drawn from the masker. A small signal masked by the masking curve may be a masked signal or a maskee. The masked signal is removed, and only the remaining signals remain as valid signals. This process is referred to as masking.

The quantizer 1640 may quantize transform coefficients of a window obtained by the frequency transformer 1630, by using the masking threshold determined by the psycho-acoustic model unit 1650.

The quantizer 1640 may generate noise while quantizing the transform coefficients. The quantizer 1640 may quantize the transform coefficients so that generated noise remains lower than the masking threshold. Quantization noise remaining lower than a masking threshold may mean that the energy of noise generated by quantization is masked due to a masking effect. In other words, quantization noise lower than the masking threshold is inaudible.

The entropy encoder 1660 may perform entropy encoding with respect to a quantized audio signal resulting from the quantization. The entropy encoder 1660 may encode the quantized audio signal via Huffman coding, range encoding, arithmetic coding, or the like, but embodiments of the present invention are not limited thereto.

The bit stream former 1670 may produce one or more bit streams from an encoded audio signal output by the entropy encoder 1660.

The embodiment of the present invention can be embodied in a storage medium including instruction codes executable by a computer such as a program module executed by the computer. A computer readable medium can be any usable medium which can be accessed by the computer and includes all volatile/non-volatile and removable/non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes any information transmission medium.

Although the embodiments of the present invention have been disclosed for illustrative purposes, one of ordinary skill in the art will appreciate that diverse variations and modifications are possible, without departing from the spirit and scope of the invention. Thus, the above embodiments should be understood not to be restrictive but to be illustrative, in all aspects. For example, respective elements described in an integrated form may be dividedly used, and the divided elements may be used in a state of being combined.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An audio encoding method comprising:

performing pre-emphasis of increasing magnitudes of frequency components belonging to a certain band included in an audio signal;

detecting a pitch of the pre-emphasized audio signal;

determining a filter coefficient based on the detected pitch;

performing comb filtering on the audio signal, based on the determined filter coefficient; and encoding the comb filtered audio signal, wherein the encoding the comb filtered audio signal comprises:

performing windowing on the comb filtered audio signal by using a window which has an overlapping section;

delaying information about the pitch according to a decoding delay determined based on the overlapping section of the window; and producing and outputting a bit stream, the bit stream including the audio signal resulting from the comb filtering and the delayed information about the pitch.

2. The audio encoding method of claim 1, wherein the detecting of the pitch comprises acquiring, from the audio signal, information about the pitch which comprises at least one of a pitch period, a pitch gain, a pitch tap, and a flag indicating whether the comb filtering has been performed.

3. The audio encoding method of claim 1, wherein the detecting of the pitch comprises acquiring the information about the pitch from the audio signal, and the information about the pitch comprises at least one of a pitch period, a pitch gain, a pitch tap, and a flag indicating whether the comb filtering has been performed.

4. The audio encoding method of claim 3, wherein the producing and outputting of the bit stream comprises producing and outputting the bit stream such that the information about the pitch is located in an auxiliary area of the bit stream.

5. The audio encoding method of claim 1, wherein the detecting of the pitch comprises acquiring information about the pitch from each of a plurality of frames into which the audio signal has been split, the information about the pitch comprises at least one of a pitch period, a pitch gain, a pitch tap, and a flag indicating whether the comb filtering has been performed, and the encoding of the comb filtered audio signal comprises delaying the information about the pitch by one frame.

6. An audio encoding apparatus comprising:

a first filter which performs pre-emphasis of increasing magnitudes of frequency components belonging to a certain band included in an audio signal;

a pitch detector which detects a pitch of the pre-emphasized audio signal;

a comb filter which determines a filter coefficient based on the detected pitch and performs comb filtering on the audio signal based on the determined filter coefficient; and an encoder which encodes the comb filtered audio signal, wherein the encoder performs windowing on the comb filtered audio signal by using a window which has an overlapping section, delays information about the pitch according to a decoding delay determined based on the overlapping section of the window, produces and outputs a bit stream, the bit stream including the audio signal resulting from the comb filtering and the delayed information about the pitch.

7. The audio encoding apparatus of claim 6, wherein the information about the pitch comprises at least one of a pitch period, a pitch gain, a pitch tap, and a flag indicating whether the comb filtering has been performed.

8. The audio encoding apparatus of claim 6, wherein the pitch detector acquires information about the pitch from the audio signal, wherein the encoder produces and outputs a bit stream, the bit stream including the audio signal resulting from the comb filtering and the information about the pitch, and wherein the information about the pitch comprises at least one of a pitch period, a pitch gain, a pitch tap, and a flag indicating whether the comb filtering has been performed.

* * * * *